(12) United States Patent
Rahberger

(10) Patent No.: US 6,921,236 B2
(45) Date of Patent: Jul. 26, 2005

(54) TOOL FOR REPAIRING DAMAGED THREADS

(76) Inventor: Edward Rahberger, 33927 Academy Rd., Burlington, WI (US) 53105

( * ) Notice: Subject to any disclaimer, the term of this patent is extended or adjusted under 35 U.S.C. 154(b) by 407 days.

(21) Appl. No.: 10/288,199

(22) Filed: Nov. 5, 2002

(65) Prior Publication Data

US 2004/0086348 A1 May 6, 2004

(51) Int. Cl.[7] .............................................. B23G 5/04
(52) U.S. Cl. ................. 408/117; 408/1 R; 408/221; 408/222; 470/185; 470/199
(58) Field of Search ................ 408/117, 215, 408/219, 221, 222, 1 R, 238; 470/185, 186, 198, 199, 207

(56) References Cited

U.S. PATENT DOCUMENTS

| | | | | |
|---|---|---|---|---|
| 82,118 | A | * | 9/1868 | Hoermann ................ 408/117 |
| 119,565 | A | | 10/1871 | Brown |
| 574,721 | A | | 1/1897 | Elterich |
| 816,570 | A | * | 4/1906 | Edmonds ...................... 72/71 |
| 1,012,442 | A | * | 12/1911 | Richardson ................ 408/117 |
| 1,148,406 | A | * | 7/1915 | Reid .......................... 408/117 |
| 1,680,984 | A | | 8/1928 | Grove |
| 2,010,913 | A | | 8/1935 | Bruce et al. |
| 2,153,054 | A | * | 4/1939 | Smith ........................ 408/117 |
| 2,335,741 | A | * | 11/1943 | Contaldi .................... 408/222 |
| 3,061,848 | A | * | 11/1962 | Wilkins ..................... 408/117 |
| 3,715,168 | A | | 2/1973 | Kuhn |
| 4,095,917 | A | | 6/1978 | Wesner |
| 4,111,591 | A | | 9/1978 | Rolnick |
| 4,201,503 | A | | 5/1980 | Nannen |
| 4,346,491 | A | | 8/1982 | Kraus et al. |
| 4,478,539 | A | * | 10/1984 | Prevette .................... 408/117 |
| 4,572,032 | A | | 2/1986 | Kinzler |
| 4,630,978 | A | | 12/1986 | Keiser et al. |
| 4,872,790 | A | | 10/1989 | Sibole |
| 4,969,780 | A | | 11/1990 | Hermsted |
| 5,060,330 | A | | 10/1991 | Stahl |
| 5,127,776 | A | | 7/1992 | Glimpel |
| 5,197,832 | A | | 3/1993 | Porter, Jr. |
| 5,203,652 | A | * | 4/1993 | Woods ...................... 408/112 |
| 5,288,181 | A | | 2/1994 | Pinkston |
| 5,490,746 | A | | 2/1996 | Baker |
| 5,507,608 | A | | 4/1996 | Forslind |
| 5,564,173 | A | | 10/1996 | Sedman et al. |
| 5,718,636 | A | | 2/1998 | Meyn et al. |
| 5,803,676 | A | | 9/1998 | Wienss |
| 6,244,142 | B1 | * | 6/2001 | Swanson ..................... 81/460 |
| 6,386,804 | B1 | * | 5/2002 | Johnson et al. ............. 408/221 |

FOREIGN PATENT DOCUMENTS

| | | | | |
|---|---|---|---|---|
| CH | | 366718 | 2/1963 | |
| DE | | 248409 | 4/1911 | |
| DE | | 447105 | 6/1927 | |
| DE | | 482662 | * 1/1930 | ................ 408/221 |
| DE | | 857608 | 12/1952 | |
| GB | | 15500 | 12/1887 | |
| GB | | 2098527 | * 11/1982 | ............ B23G/5/20 |

OTHER PUBLICATIONS

Incomplete copy of French patent 18,984, published Jul. 14, 1857, from 408/117.*
Incomplete copy of UK patent 12,162, published Sep. 24, 1886, from 408/117.*

* cited by examiner

Primary Examiner—Daniel W. Howell
(74) Attorney, Agent, or Firm—Ryan Kromholz & Manion, S.C.

(57) ABSTRACT

A tool for rethreading a damaged threaded object having a solid body with at least one through bore including at least one cutting tooth. A slot intersects the through bore, allowing relief for shavings removed from the object as it is rethreaded. The tool can be adapted to receive a pivot arm to increase the force exerted on the object. Multiple through bores and cutting teeth of varying sizes can be formed in a single tool. The tool may also be adapted to be used in conjunction with taps of varying sizes.

7 Claims, 6 Drawing Sheets

TOOL FOR REPAIRING DAMAGED THREADS

BACKGROUND OF THE INVENTION

The threads on threaded bolts and similar threaded objects become damaged over time and use. Rather than replace a bolt when it becomes worn, tools have been invented to repair the damaged threads.

The basic design for a thread repair or a die can be seen in Elterich (U.S. Pat. No. 574,721). Elterich shows a die having a threaded cylinder imposed over a cloverleaf design. The cloverleaf allows removal of shavings from the bolt while the bolt is being rethreaded. However, the cloverleaf design compromises the strength of the die. If a bolt is badly damaged, cloverleaf designed dies do not necessarily allow a user to exert heavy torque on the bolt, since the extra pressure may cause the tool to bend, thereby not providing a true rethreading of the bolt. Also, because a large portion of the bolt is generally not in constant contact with the die, the rethreading process is not as smooth as it possibly could be.

To alleviate these problems dies have been designed that may be adapted for use with a wrench, socket driver, or similar device. For example, Kuhn (U.S. Pat. No. 3,715,168) and Baker (U.S. Pat. No. 5,490,746) disclose diestocks that can be used with an ordinary socket wrench. While these devices allow a user to apply more pressure when rethreading a bolt, they are made to conform to a single bolt size. If it is necessary to rethread a bolt of a different size, the diestock must be removed from the ratchet, and the new diestock must be found and connected to the ratchet. This can lead to diestocks being lost or misplaced, and can aggravate the user. The present invention overcomes the disadvantages noted above by providing a sturdy, adaptable rethreading tool.

Not only may bolts need rethreading, but nuts, or internally threaded objects may also need to be rethreaded. As with diestocks, it may not be certain what size tap is needed for a specific nut. The common tap is usually screwed into a chuck or handle, and if a user wishes to change a tap, the tap must be unscrewed and the new tap must be secured to the chuck. This can be a tedious process.

All of the above-noted prior art devices consist of multiple parts that must be assembled prior to use. They are traditionally expensive to manufacture. It is also necessary that all of the component parts must be stored in a container or case. This too adds to the expense of the prior art tools.

SUMMARY OF THE INVENTION

The present invention discloses a simple, yet strong, tool for repairing damaged threads on threaded objects. The tool consists of a substantially solid body made from a hardened steel or similar material with predetermined threaded through bores running through the body's thickness. The through bores, of which there can be any number located on the body, are designed to accommodate the most standard sized bolts. This allows a user to easily change from one die size to another, without having to look for different tools or adaptors.

The threaded through bores have a thin slot running through their center. As a bolt is brought near the tool, the tool is rotated onto the bolt at a threaded through bore correctly sized to the size of the bolt. As the tool is rotated around the central axis of the through bore, the bolt is worked into a through bore having a substantially similar diameter as the bolt. The threads formed within the bore engage and restore the threads on the bolt. This may comprise the cutting or removal of material from the damaged bolt and/or the deforming or cold forming of material to restore the damaged threads. The thin slots define a relief area wherein the shavings may be deposited so as not too interfere with the rethreading process, while still maintaining the strength of the overall tool.

Also, the tool can be designed to receive taps for rethreading internally threaded objects. The tool will contain any number of adaptors that can receive taps of varying sizes. The taps can be added and removed easily from the tool without the added process of loosening or unscrewing a currently used tap.

If extra force is needed to repair a bolt, the tool has a polygonal hole that can receive a lever extension, such as a drive socket wrench, or another type of wrench, such as an allen wrench. The device can be designed to receive any size wrench or socket.

DETAILED DESCRIPTION

Although the disclosure hereof is detailed and exact to enable those skilled in the art to practice the invention, the physical embodiments herein disclosed merely exemplify the invention, which may be embodied in other specific structures. While the preferred embodiment has been described, the details may be changed without departing from the invention, which is defined by the claims.

Figure 1:
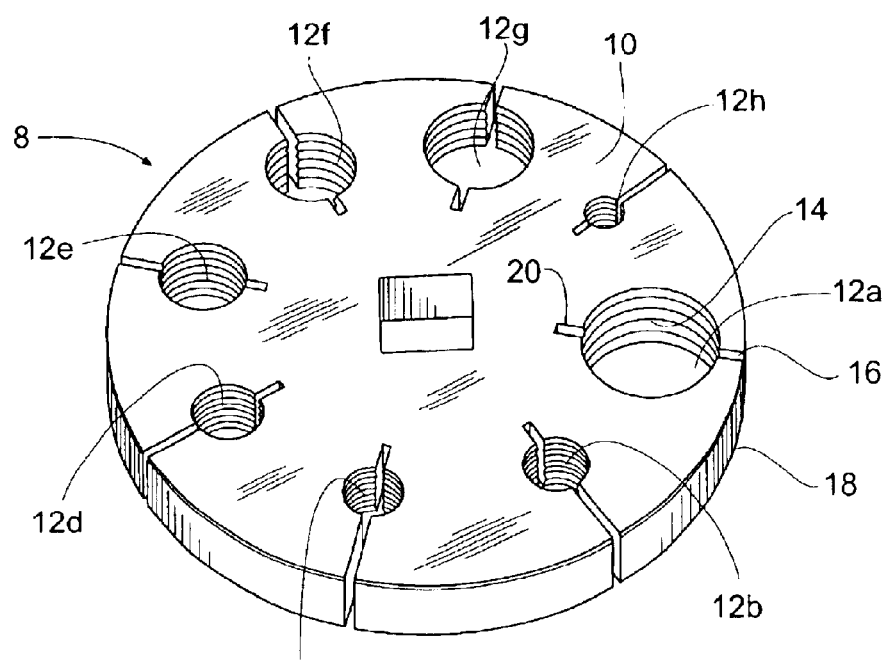
FIG. 1 is a perspective view of the present invention.

FIG. 1 shows a perspective view of a threading tool 8 made in accordance with this invention. The threading tool 8 consists of a body 10 having a plurality of through bores, 12a, 12b, 12c, 12d, 12e, 12f, 12g, and 12h. The through bores 12a–12h are of varying sizes to coincide with the most standard sizes of bolts and threaded objects that are known in the art. The through bores 12a–12h are generally perpendicular to the relatively flat body 10. While the body 10 is shown with the above stated through bores, the invention would still be operable with as many through bores as could possibly fit on the body 10, and as few as one (1) through bore. The through bore 12a will be discussed as exemplary of all the through bores, since the properties noted are attributable to any of the through bores.

Still referring to FIG. 1, the through bore 12a has at least one threaded or helical cutting tooth 14. The cutting tooth 14 runs the entire length of the through bore 12a. A slotted area or relief area 16 runs through the opening 12a from a perimeter 18 of the flat body 10, to a marginal area 20 of the through bore 12a. The slotted area 16 is shown intersecting the through bore 12a and the threaded cutting tooth 14 at a generally diametrical position, though it is possible that the slotted area 16 would intersect the through bore 12a and the threaded cutting tooth 14 at some other angle and still achieve similar results for the rethreading tool 8.

The body 10 can be made of hardened steel, tool steel, a steel alloy, or any other similarly available material that has sufficient rigidity to rethread a bolt without deforming during the process. Also, while the tool 8 is shown to be a relatively flat circular disk, the size and shape of the tool 8 could be altered, such as into the shape of a square or a sphere, without departing from the invention.

Figure 2:
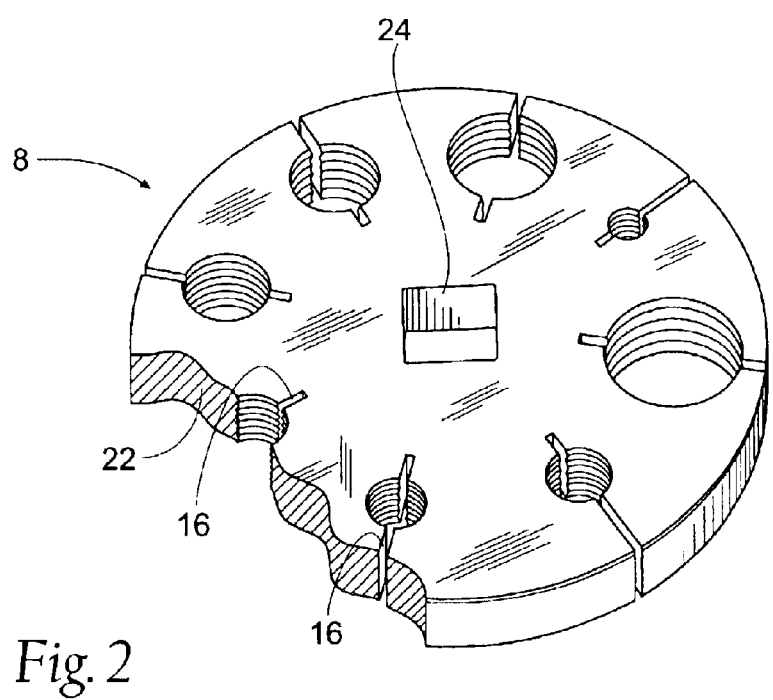
FIG. 2 is a cut-away perspective view of the invention in FIG. 1.

Referring to FIG. 2, the rethreading tool 8 in FIG. 1 is shown with a cutaway section. The body 10 can be seen to have a thick, solid body 22, which adds strength to the tool 8 when being used. The slotted area 16 encompasses a minimal amount of the body 22. This is especially important when a polygonal opening 24 interacts with a removable lever arm extension 26 (see FIGS. 5, 6, and 7) to exert extra torque on the threading tool 8. The polygonal opening 24 is preferably shown in the center of the tool 8, but any position of the opening 24 laterally spaced from the through bore 12a will allow proper operation of the tool 8.

Figure 3:
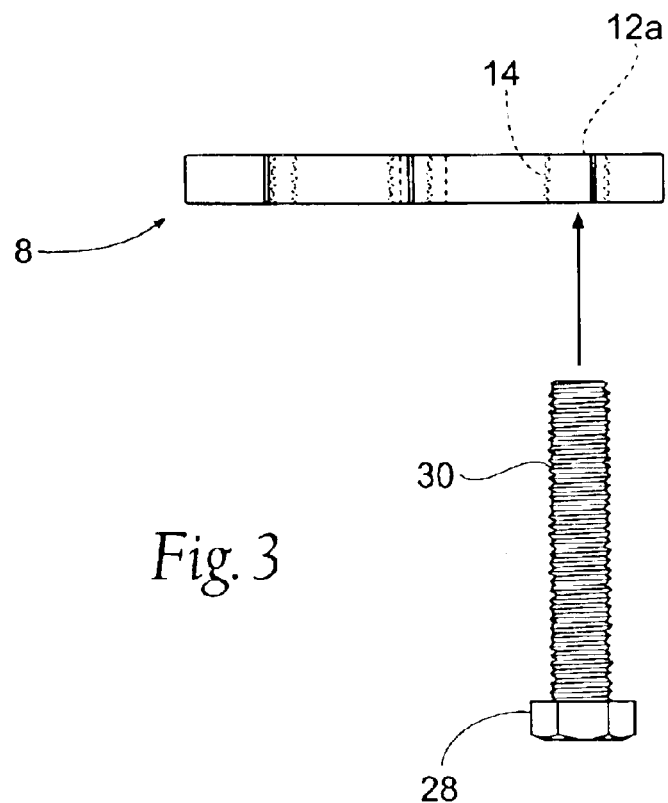
FIG. 3 is a side view of the invention in FIG. 1 along with a damaged bolt.

FIG. 3 is a side view of the rethreading tool 8. A bolt 28 with a damaged thread 30 is shown proceeding generally perpendicularly towards the threading tool 8 where the through bore 12a is located. The thread 30 will be aligned with the cutting tooth 14.

Figure 4:
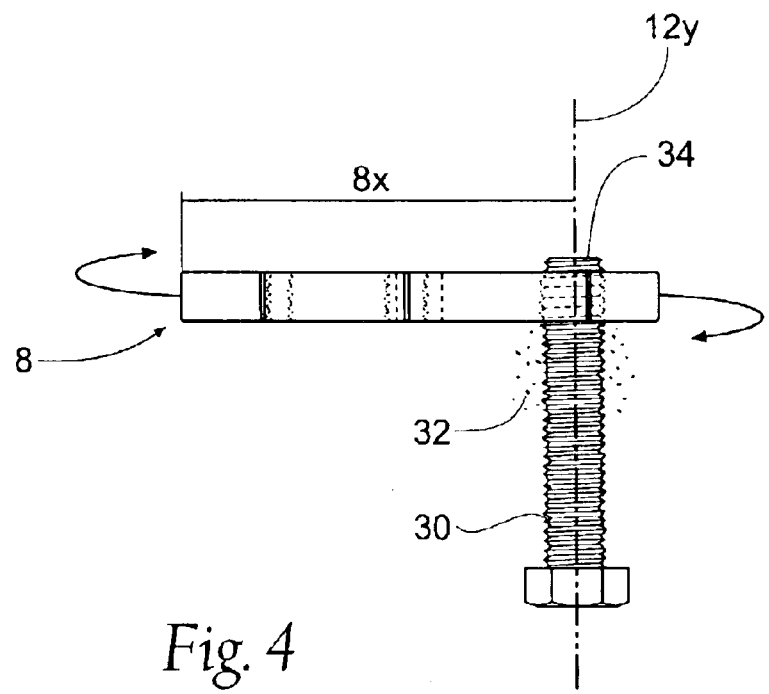
FIG. 4 shows the invention in FIG. 3 receiving the bolt.

In FIG. 4, the rethreading tool 8 is shown interacting with the damaged thread 30 of the bolt 28. As the threads 30 enter the through bore 12a, the tool 8 is manually turned clockwise around an axis of rotation 12y. As the tool 8 is rotated, shavings 32 are removed from the damaged thread 30, and a newly rethreaded bolt 34 begins to emerge from the top of the tool 8. The tool 8 acts as a lever 8x to assist the rethreading process.

Figure 4A:
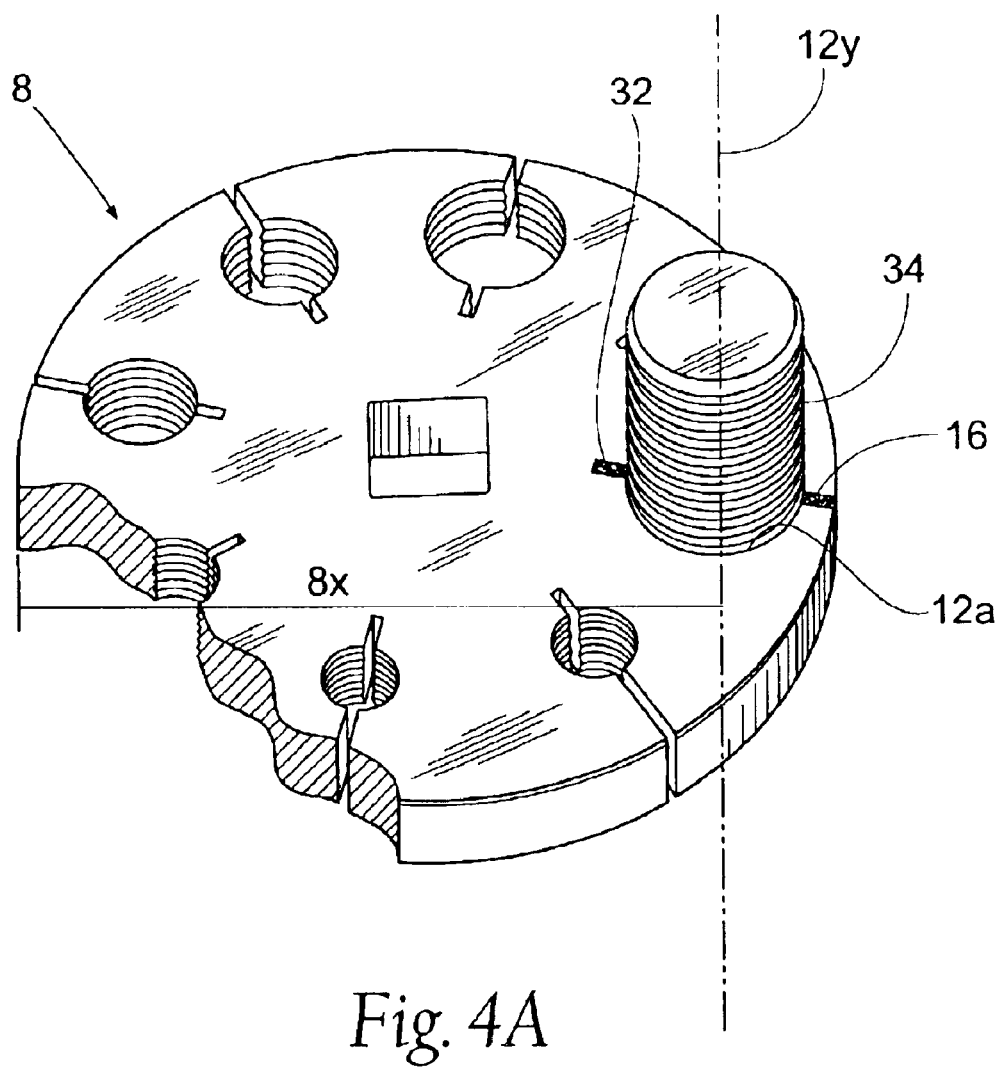
FIG. 4A is a perspective view of the invention with a newly rethreaded bolt.

FIG. 4A shows a portion of the newly rethreaded bolt 34 completely passed through the tool 8. The shavings 32 that have been removed from the bolt 34 are contained in the slotted area 16, thereby not allowing the shavings 32 to interfere with the rethreading process. The axis of rotation 12y can be seen as being coaxially aligned with the through bore 12a.

Figure 5:
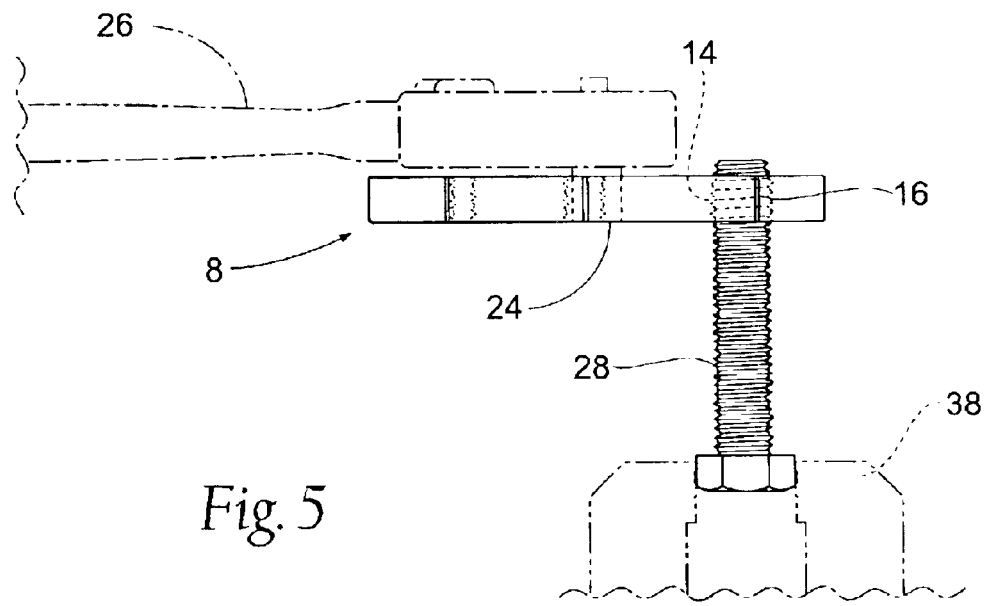
FIG. 5 is a side view of the invention of FIG. 3 receiving a drive socket wrench.

Occasionally, the threads on a bolt 34 may be damaged to the extent that one cannot turn the rethreading tool 8 without the use of external force. FIG. 5 shows a side view of the rethreading tool 8 receiving the removable lever arm extension 26 in the polygonal opening 24. The removable lever arm extension 26 is shown as a socket wrench. The polygonal opening 24 is designed to receive the removable lever arm extension 26 directly, but an extension (not shown) could be added to the lever arm extension 26 if preferred. Additionally, the polygonal opening 24 can be designed to receive other objects having a polygonal shape that can act as the extension arm 26, such as an allen or hexagonal wrench (see FIG. 7). Any suitable gripping body 38 holds the bolt 28 in place.

Still referring to FIG. 5, the rethreading tool 8 is turned clockwise around the axis 12y (see FIG. 6) with assistance from the lever arm extension 26, the direction being the same as shown in FIG. 4. Because the body 22 (FIG. 2) is substantially solid and only a minimal area of the body 22 is removed for the slot 16, the use of extra force by way of the lever arm extension 26 does not distort the shape of the cutting tooth 14 and allows for a true rethreading of the bolt 28.

Figure 6:
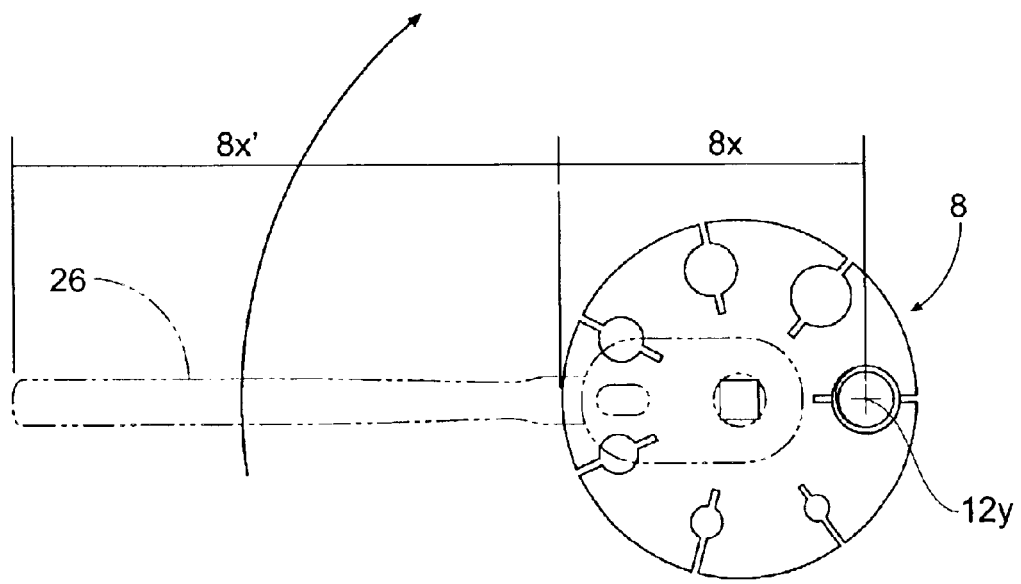
FIG. 6 is a top view of the invention of FIG. 5.
Figure 7:
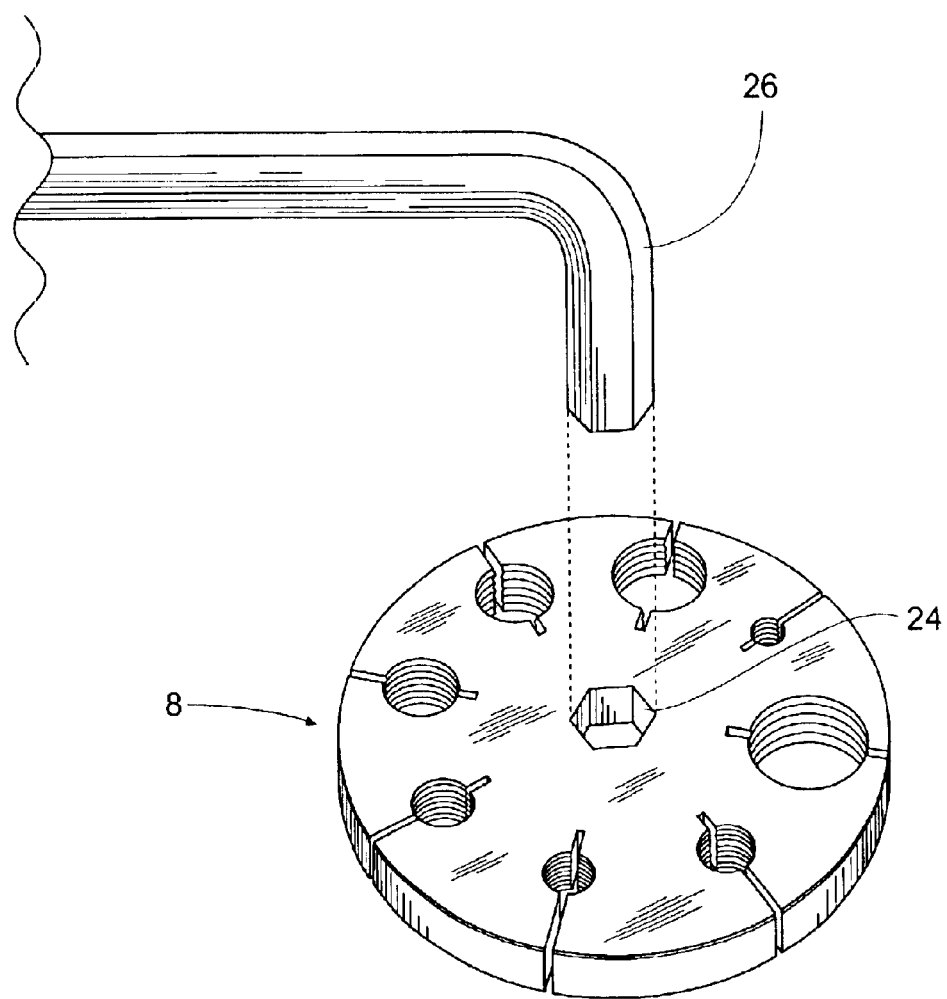
FIG. 7 is a perspective view of the present invention adapted to receive a hexagonal wrench.

FIG. 6 shows an overhead view of the tool 8 using the lever arm extension 26. The extension 26 is rotated clockwise around the axis 12y. The length of the extension past the end of the tool 8 (represented as 8x') adds to the length of the lever arm 8x. Thus, by using the extension arm 26, the new lever arm can be represented by 8x+8x', and allows one to easily provide extra force for the rethreading process.

While the rethreading tool 8 having the single through bore 12a will sufficiently rethread a bolt, there are advantages of designing the rethreading tool 8 as shown in FIG. 1 having the plurality of through bores 12a–12h. For instance, one may not know definitively the actual diameter of a bolt or other threaded object. The rethreading tool 8 allows one to easily decide which of the through bores 12a–12h a bolt fits into without having to sample numerous rethreading tools. Likewise, the tool 8 can be designed to have through bores 12a–12h be of different measuring systems for bolts, such as ANSI standard or metric, on the same rethread tool 8. Not only will it be quick and easy to decide which is the proper through bore to use, but the user can easily confirm whether a bolt is a standard thread or a metric thread, thereby easing the problem of potentially misthreading a bolt.

Figure 8:
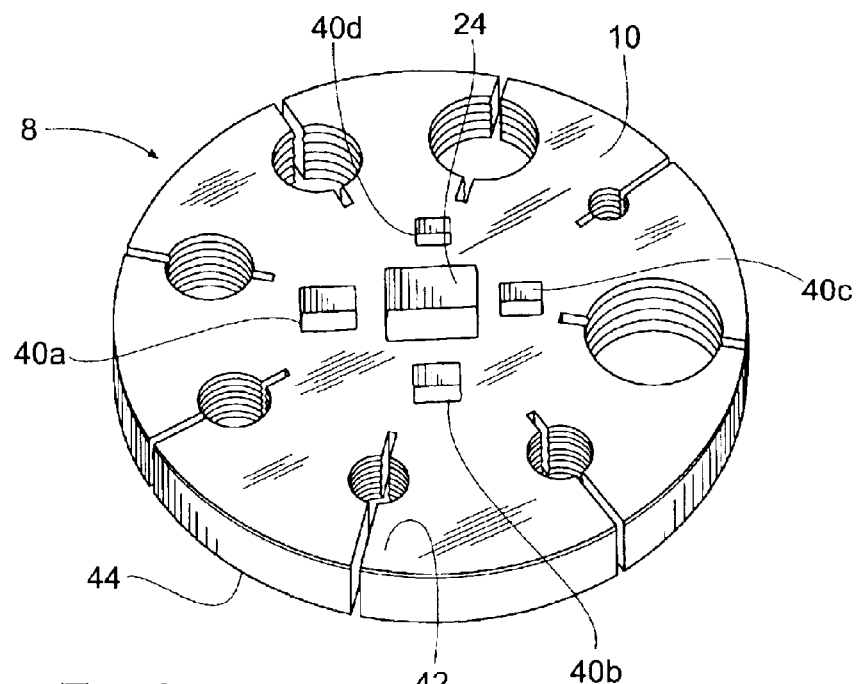
FIG. 8 is a perspective view of a second embodiment of the present invention containing areas to receive a tap.

FIG. 8 shows a perspective view of a second embodiment of the rethreading tool 8. The embodiment shown in FIG. 8 is similar to the first embodiment except that the tool is also adapted to receive a tap 46 (see FIG. 9). The tool 8 is shown with a plurality of adaptors or cavities 40a, 40b, 40c, and 40d. The cavities 40a–40d are designed to receive taps of varying sizes, which allows the body 10 to act as a chuck for the inserted taps. The cavities 40a–40d are shown in FIG. 8 as extending through the body 10 from a top surface 42 to a bottom surface 44. However, it is conceivable that the cavities may not extend completely through the body 10 of the tool. Provided that the cavities are sufficiently deep to hold and secure a tap in place, it is possible that the cavities are only engageable by a tap from either of the surfaces, 42 or 44.

As shown in FIG. 8, the cavities 40a–40d are arranged in a symmetrical fashion around the pivot support 24. A symmetrical design is not necessary, but such a design allows the tool 8 to maintain sufficient strength when being used for tapping a threaded object. Likewise, the cavities 40a–40d are arranged radially on the body 10 inside of the through bores. While the cavities could be located in the same radial location as the through bores, or even in a radial location outside of the through bores, the shown relationship allows the tool 8 to retain a desired amount of strength while retaining a high level of utility.

Figure 9:
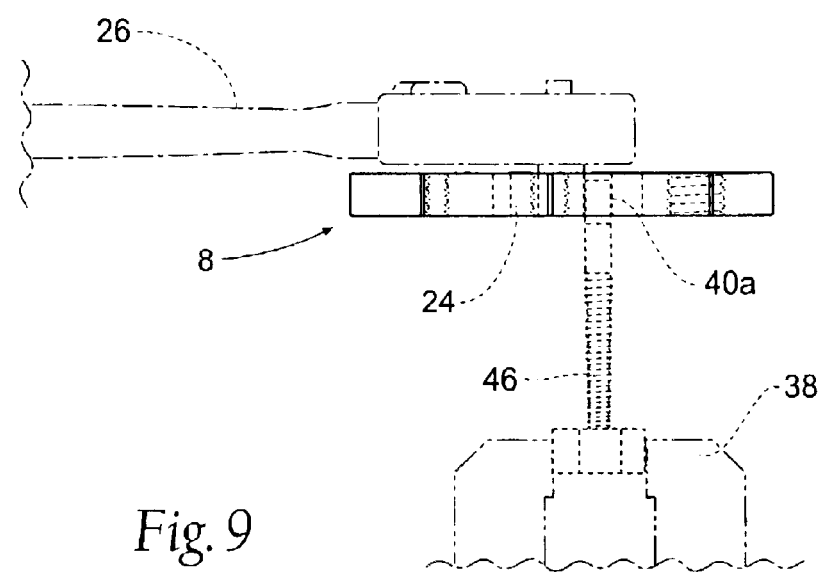
FIG. 9 is a side view of the embodiment in FIG. 8 communicating with a tap.

FIG. 9 is a side view of the tool 8 receiving the tap 46. As previously shown in FIGS. 5 and 6, the lever arm extension 26 (shown as a socket wrench) is adapted to the pivot support 24, and can be used to rotate the tool 8 and the tap 46. The axis of rotation is centered on the cavity being used, in this instance 40a.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method for repairing a threaded object, the method comprising the steps of:
   supplying a tool comprising:
   a body including a through bore containing at least one threaded cutting tooth,
   said through bore being coaxial with an axis of rotation of said tool,
   said body further defining a lever arm extending laterally from and pivotally relative to said axis of rotation,
   a slotted area in said body, said slotted area extending inwardly to intersect said through bore, and
   a polygonal opening laterally spaced from said through bore, said polygonal opening said opening arranged to receive a removable lever arm extension member having a like polygonal configuration as said opening;
   supplying a threaded object needing rethreading;
   bringing said threaded object towards said rethreading tool at an angle generally perpendicular to the axis of through bore;
   entering said threaded object into said through bore;
   inserting said removable lever arm extension into said polygonal opening means; and
   rotating said removable lever arm extension in a clockwise motion around said axis of rotation so that the tool also rotates in a clockwise motion until the said threaded object is sufficiently rethreaded.

2. The method according to claim 1, further providing said pivot arm in the form of a socket wrench.

3. The method according to claim 1, further providing said pivot arm in the form of an allen wrench.

4. A chuck for gripping the non-threaded portion of a tap, said chuck comprising:
   a disc having a thickness defined by oppositely disposed surfaces,
   a pivotal cavity located in one of said surfaces of said disc and being coaxial with an axis of rotation of said chuck, said cavity being arranged to removably grip said tap,
   said disc further defining a lever arm extending laterally from and pivotally relative to said axis of rotation, said disc containing a plurality of laterally spaced pivotal cavities, each of said cavities being coaxial with a preselected axes of rotation,
   said plurality of cavities being of varying sizes,
   said plurality of cavities being circumferentially spaced relative to one another,
   said disc further defining a plurality of lever arms corresponding to each of said cavities and extending laterally from and pivotally relative to each of said axes of rotation; and
   a polygonal opening laterally spaced from said pivotal cavity, said opening arranged to receive a removable lever arm extension member having a like polygonal configuration as said opening.

5. A thread repair tool comprising:
   a disc having a thickness defined by oppositely disposed substantially planar surfaces,
   a through bore located in said disc containing at least one thread cutting tooth, said through bore being coaxial with an axis of rotation of said tool,
   a slotted area, said slotted area extending inwardly from the periphery of the disc and intersecting said through bore,
   a pivotal cavity located on at least one of said surfaces of said disc and being coaxial with an axis of rotation of said tool, said cavity being arranged to removably grip a tap,
   said disc further defining a lever arm extending laterally from and pivotally relative to said axes of rotation, and
   a polygonal opening laterally spaced from said pivotal cavity and said through bore, said opening arranged to receive a removable lever arm extension member having a like polygonal configuration as said opening.

6. A tool according to claim 5 wherein said disc contains
   a plurality of laterally spaced pivotal cavities, each of said cavities being coaxial with a preselected axes of rotation,
   said plurality of cavities being of varying sizes, said cavities being circumferentially spaced relative to one another,
   a plurality of laterally spaced through bores of varying sizes, said plurality of through bores being circumferentially spaced relative to one another,
   a plurality of slotted areas, said slotted areas extending inwardly from the periphery of the disc and one of said slotted areas intersecting one of said through bores,
   said disc further defining a plurality of lever arms corresponding to each of said cavities and each of said through bores, said plurality of lever arms extending laterally from and pivotally relative to each of said axes of rotation.

7. A tool according to claim 6 wherein said polygonal opening is centrally located on said disk, said plurality of through bores is radially arranged with respect to said polygonal opening, and said plurality of cavities is arranged radially with respect to the polygonal opening and between said plurality of through bores and said polygonal opening.

* * * * *

UNITED STATES PATENT AND TRADEMARK OFFICE
CERTIFICATE OF CORRECTION

PATENT NO. : 6,921,236 B2
DATED : July 26, 2005
INVENTOR(S) : Edward Rahberger

It is certified that error appears in the above-identified patent and that said Letters Patent is hereby corrected as shown below:

Column 5,
Line 14, after "polygonal opening" delete "said opening".

Signed and Sealed this

Seventh Day of March, 2006

JON W. DUDAS
*Director of the United States Patent and Trademark Office*